United States Patent
Yang (10) Patent No.: US 11,223,965 B2
(45) Date of Patent: Jan. 11, 2022

(54) METHOD AND APPARATUS FOR CONTROLLING NETWORK SENSORS

(71) Applicant: INTERDIGITAL CE PATENT HOLDINGS, SAS, Paris (FR)

(72) Inventor: Rong Yang, Shanghai (CN)

(73) Assignee: INTERDIGITAL CE PATENT HOLDINGS, SAS, Paris (FR)

(*) Notice: Subject to any disclaimer, the term of this patent is extended or adjusted under 35 U.S.C. 154(b) by 0 days.

(21) Appl. No.: 16/332,395

(22) PCT Filed: Sep. 13, 2016

(86) PCT No.: PCT/CN2016/098799
§ 371 (c)(1),
(2) Date: Mar. 12, 2019

(87) PCT Pub. No.: WO2018/049552
PCT Pub. Date: Mar. 22, 2018

(65) Prior Publication Data
US 2020/0213878 A1 Jul. 2, 2020

(51) Int. Cl.
- *H04W 24/04* (2009.01)
- *H04W 4/70* (2018.01)
- *H04W 4/80* (2018.01)
- *H04W 8/24* (2009.01)
- *H04W 84/20* (2009.01)
- *H04W 88/16* (2009.01)

(52) U.S. Cl.
CPC ........... *H04W 24/04* (2013.01); *H04W 4/70* (2018.02); *H04W 4/80* (2018.02); *H04W 8/245* (2013.01); *H04W 84/20* (2013.01); *H04W 88/16* (2013.01)

(58) Field of Classification Search
CPC ......... H04W 24/04; H04W 4/70; H04W 4/80; H04W 8/245
See application file for complete search history.

(56) References Cited

U.S. PATENT DOCUMENTS 6,032,266 A * 2/2000 Ichinohe ............... G06F 11/00
7,403,980 B2 * 7/2008 Stringer-Calvert ... G06F 15/173
(Continued)

FOREIGN PATENT DOCUMENTS

| CN | 102421205 | 4/2012 |
| CN | 102448195 | 5/2012 |

(Continued)

OTHER PUBLICATIONS

Benazzouz et al., "A fault fuzzy-ontology for large scale fault-tolerant wireless sensor networks", Procedia Computer Science, vol. 35, 2014, pp. 203-212.

(Continued)

*Primary Examiner* — Ronald B Abelson
(74) *Attorney, Agent, or Firm* — Volpe Koenig (57) ABSTRACT

The disclosure provides a method and an apparatus for controlling ZigBee® sensors. The method comprises: selecting a second coordinator of a second ZigBee® network as a backup coordinator; detecting whether there is a failure of a first ZigBee® coordinator; and if a failure of the working coordinator is detected, designating the second ZigBee® coordinator as the networking coordinator for the end user devices in the first ZigBee® network to join the second ZigBee® network.

8 Claims, 7 Drawing Sheets

(56) References Cited

U.S. PATENT DOCUMENTS

| | | | | |
|---|---|---|---|---|
| 2003/0050037 | A1* | 3/2003 | Goedicke | H04M 1/00 |
| 2003/0174814 | A1* | 9/2003 | Diacakis | H04M 1/64 |
| 2008/0037431 | A1 | 2/2008 | Werb et al. | |
| 2009/0316601 | A1* | 12/2009 | Zhu | H04L 12/28 |
| 2011/0148349 | A1* | 6/2011 | Kim | H02J 7/00 |
| 2014/0204727 | A1 | 7/2014 | Gu et al. | |
| 2014/0328161 | A1 | 11/2014 | Haddad et al. | |
| 2014/0369232 | A1* | 12/2014 | Kim | H04W 60/00 |
| 2015/0249588 | A1 | 9/2015 | Leon et al. | |
| 2017/0289255 | A1* | 10/2017 | Urquhart | H04L 29/08 |
| 2019/0095293 | A1* | 3/2019 | Zhang | G06F 11/20 |

FOREIGN PATENT DOCUMENTS

| | | |
|---|---|---|
| CN | 102917384 | 2/2013 |
| CN | 103260170 A | 8/2013 |
| CN | 103312546 A | 9/2013 |
| CN | 105338662 A | 2/2016 |

OTHER PUBLICATIONS

Kollin et al., "Transparent Coordinator Failure Recovery for ZigBee Networks", 2009 IEEE Conference on Emerging Technologies & Factory Automation, Mallorca, Spain, Sep. 22, 2009, 8 pages.

Koubaa et al., "Real-Time Tracking and Reporting of Dynamic Events in Hierarchical Wireless Sensor Networks", Hurray Technical Report 070503, IPP Hurray! Research Group, Polytechnic Institute of Porto—School of Engineering, Porto, Portugal, May 3, 2007, 8 pages.

Forster et al., "Clique: Role-Free Clustering with Q-Learning for Wireless Sensor Networks", 2009 29th IEEE International Conference on Distributed Computing Systems, Montreal, Canada, Jun. 22, 2009, pp. 441-449.

Gupta et al., "Fault-Tolerant Clustering of Wireless Sensor Networks", 2003 IEEE Wireless Communications and Networking Conference (WCNC 2003), New Orleans, Louisiana, USA, Mar. 16, 2003, pp. 1579-1584.

Bordencea et al., "Agent Based System for Home Automation, Monitoring and Security", 2011 34th International Conference on Telecommunications and Signal Processing (TSP), Budapest, Hungary, Aug. 18, 2011, pp. 165-169.

Lee et al., "Rendezvous-based data dissemination for supporting mobile sinks in multi-hop clustered wireless sensor networks", Wireless Networks, vol. 20, No. 8, Nov. 2014, pp. 2319-2336.

Tai et al., Cluster-Based Failure Detection Service for Large-Scale Ad Hoc Wireless Network Applications, 2004 International Conference On Dependable Systems And Networks, Florence, Italy, Jun. 28, 2004, pp. 805-814.

* cited by examiner

METHOD AND APPARATUS FOR CONTROLLING NETWORK SENSORS

This application claims the benefit, under 35 U.S.C. § 365 of International Application PCT/CN2016/98799, filed Sep. 13, 2016, which was published in accordance with PCT Article 21(2) on Mar. 22, 2018, in English, and is incorporated herewith.

TECHNICAL FIELD

The disclosure generally relates to network technology, and more particularly, to a method and an apparatus for controlling network sensors.

BACKGROUND

Nowadays, WSP (Wireless Sensor Protocol) based services are widely applied, for example, in home automation, healthcare, and surveillance. In order to provide such services to end users, there usually has a client device in the end user's home/building. Such a client device is managing the user's own network via different WSPs, such as ZigBee® and Z-wave® sensors. ZigBee® products are available via ZigBee® Alliance partners, Z-Wave® sensors are available via Z-Wave® Alliance partners. The client device will be taken as an IP-based client for the remote management from a service provider. A normal approach is to combine all Internet data services in a client device, which are provided from the same service provider. The major reason for this is that the service provider cannot manage the wireless sensors directly since the transmission of such wireless sensors normally is limited within miles or even several hundred meters.

Figure 1:
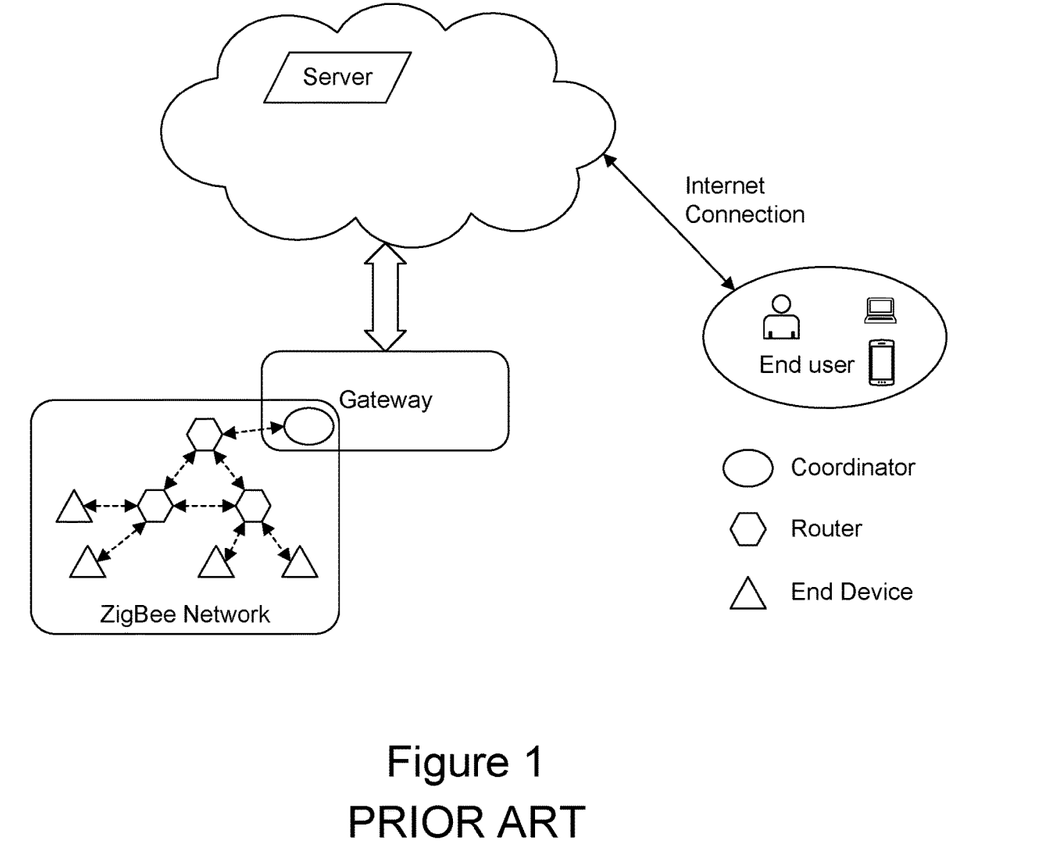
FIG. 1 is a schematic diagram showing the structure of a ZigBee® network.

ZigBee® is one of the popular WSPs, which is especially used for wireless sensor networks, building automation, and low data rate measurement applications. In order to manage the ZigBee® network remotely, a ZigBee® coordinator needs to be attached to a gateway as a WSP control unit, with which a transmission path can be built to transmit and manage all these ZigBee® sensors to the cloud. FIG. 1 is a schematic diagram showing the structure of a ZigBee® network. As shown in FIG. 1, an end user can remotely connect and manage ZigBee® devices via his/her own Internet infrastructure. Basically, a ZigBee® device can play a role as a coordinator (shown as a circle), a router (shown as a hexagon) or an end user device (shown as a triangle). The ZigBee® device which starts the network is called a ZigBee® coordinator.

Figure 2:
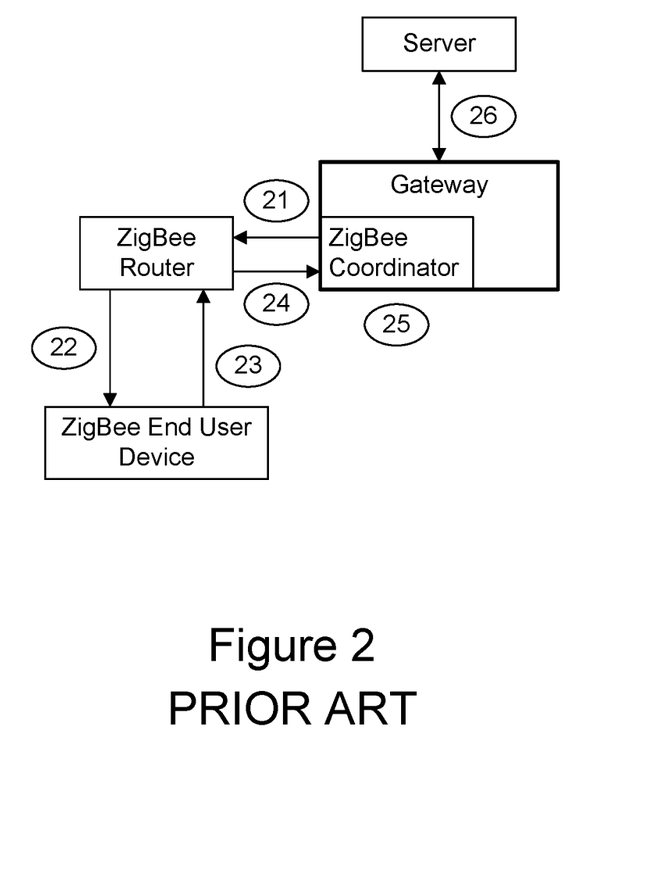
FIG. 2 is a schematic diagram the process for a ZigBee® coordinator to establish a ZigBee® network.

The process for a ZigBee® coordinator to establish a ZigBee® network will be described with reference to FIG. 2. When the ZigBee® coordinator initiates the ZigBee® network, at step 21 it broadcasts a beacon message to ask the neighboring devices to join. After a ZigBee® Router joins the ZigBee® network, at step 22 it will broadcast a beacon message to a ZigBee® end user device which will ask for joining the ZigBee® network via the closest ZigBee® Router at step 23. At step 24, the ZigBee® router will feedback the information of connected ZigBee® end user devices to the ZigBee® coordinator. Then at step 25 the ZigBee® coordinator can determine the ZigBee® router for each of the ZigBee® end user devices. The ZigBee® coordinator can also detect if there are any ZigBee® routers or ZigBee® end user devices that have not joined the ZigBee® network. The ZigBee® network can be formed with the above process. A communication channel can be established between Server and ZigBee® network with a gateway at step 26 shown in FIG. 2.

As described above, since a ZigBee® coordinator starts the establishment of a ZigBee® network, only one ZigBee® coordinator is allowed in each ZigBee® network. In addition, a ZigBee® coordinator is not allowed to join an existing network. For this reason, the ZigBee® network has a problem called the Single Point Failure of Coordinator. As described above, since there is only one ZigBee® coordinator allowed in each ZigBee® network and the coordinator node is not allowed to join another existing network, if there is a single point failure of one ZigBee® coordinator, it will be extremely difficult for the ZigBee® devices which are connected with the failed coordinator to join any other existing ZigBee® networks.

Figure 3:
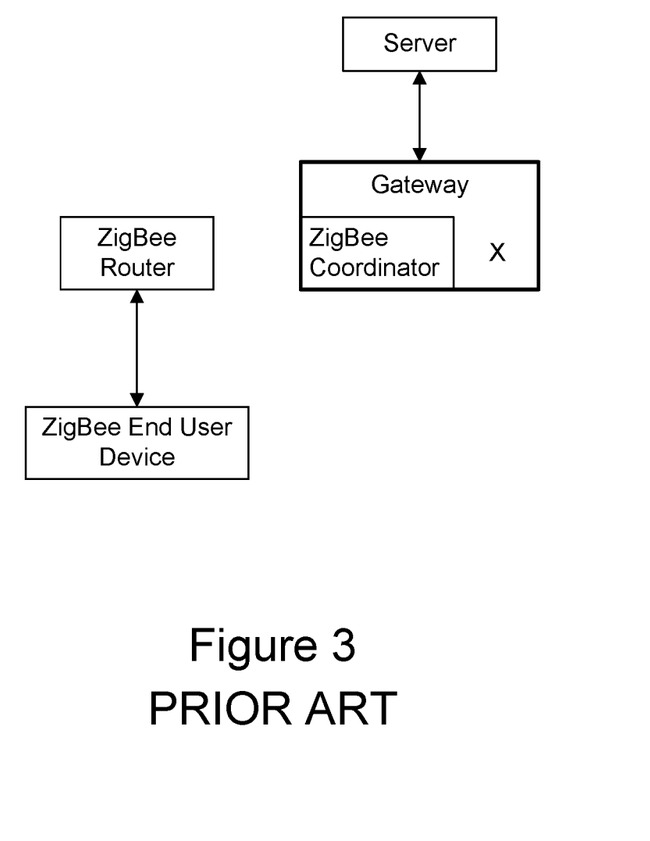
FIG. 3 is a schematic diagram showing a Single Point Failure of Coordinator in a ZigBee® network.

FIG. 3 is a schematic diagram showing a Single Point Failure of Coordinator in a ZigBee® network. As shown in FIG. 3, when this problem happens, the working ZigBee® Router cannot select a new ZigBee® coordinator to form a new ZigBee® network. In such case, the server is not able to communicate with the new ZigBee® network due to the failure of original ZigBee® coordinator which is attached to the gateway. Thus the end user and any cloud-based services cannot get any real-time information of these ZigBee® sensors which will not be manageable any more until the ZigBee® coordinator is restored. In practical applications, such interruption period might be minutes, days, or even months. The Single Point Failure of Coordinator may become a serious problem for ZigBee® network, especially in some context such as surveillance and home healthcare. A ZigBee® network can support different network structures, such as star, tree and mesh. All of these network structures may suffer from such coordinator failure.

Therefore, there is a need to address such problem of Single Point Failure of Coordinator in ZigBee® network.

In a known solution, when an original coordinator failed, one of the other ZigBee® router nodes in the ZigBee® network will be selected as the coordinator. This is a typical redundancy solution for an independent ZigBee® network. However, if the ZigBee® network has a structure of a star or tree topology, this approach cannot work in some cases. In addition, such approach has a disadvantage for the network deployment shown in FIG. 1. In FIG. 1, the ZigBee® Coordinator is always attached to a gateway, which is working as a proxy to connect service provider's network and the user's own ZigBee® network. If the ZigBee® coordinator in the gateway fails, the cloud service cannot work even if the router takes control of the ZigBee® network.

Another approach is to deploy two gateways in a ZigBee® network, one of which will always work as a redundancy node of both ZigBee® coordinators and transmission path to the cloud. These two ZigBee® coordinators sync up regularly to keep as an active-inactive redundancy model. Obviously, this approach is neither user friendly nor cost-effective. It also increases the complexity of the solution of the service provider. This approach needs to switch between two gateways due to the functionality of ZigBee® Coordinator and synchronize with the cloud-based services in a real time manner. The gateway switching will lead to an interruption of some gateway functionalities.

Therefore, there is a need for a solution for controlling ZigBee® sensors to address the above-described Single Point Failure of Coordinator in a ZigBee® network.

SUMMARY

According to an aspect of the disclosure, a method for controlling ZigBee® sensors is provided, comprising: upon detection of a failure of a first ZigBee® sensor which is a coordinator in a first ZigBee® network, designating a second ZigBee® sensor as the coordinator for the ZigBee® sensors in the first ZigBee® network to join the second ZigBee® network.

In an embodiment, the first ZigBee® network and the second ZigBee® network are under the control of a same gateway.

In an embodiment, the first ZigBee® network is under the control of a first gateway and the second ZigBee® network is under the control of a second gateway.

In an embodiment, the first gateway and the second gateway are for the same user.

In an embodiment, the first gateway and the second gateway are for two different users receiving services from a same service provider.

In an embodiment, the second ZigBee® sensor is selected from coordinators of the second gateway as a function of their distances to the first ZigBee® sensor.

In an embodiment, the method further comprises selecting a coordinator of the second gateway which has the shortest distance to the first ZigBee® sensor as the second ZigBee® sensor.

In an embodiment, the method further comprises sending all the network settings to the second ZigBee® sensor.

In an embodiment, the method further comprises changing the MAC address and the ZigBee® Key of the second ZigBee® sensor to be the same as that of the first Zig Bee® sensor.

According to another aspect of the disclosure, an apparatus for controlling ZigBee® sensors includes a processor configured to, upon detection of a failure of a first ZigBee® sensor which is a coordinator in a first ZigBee® network, designate a second ZigBee® sensor as the coordinator for the ZigBee® sensors in the first ZigBee® network to join the second ZigBee® network.

In an embodiment, the apparatus is provided at a server side of a service provider of the first and second ZigBee® networks.

In an embodiment, the apparatus is provided at a gateway for the first and second ZigBee® networks.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be described below with reference to the drawings. It should be noted that the following embodiments are illustrative only, rather than limiting the scope of the disclosure. Detailed description of any well-known steps, devices, components and the like is omitted here to avoid obscuring the disclosure.

Figure 4:
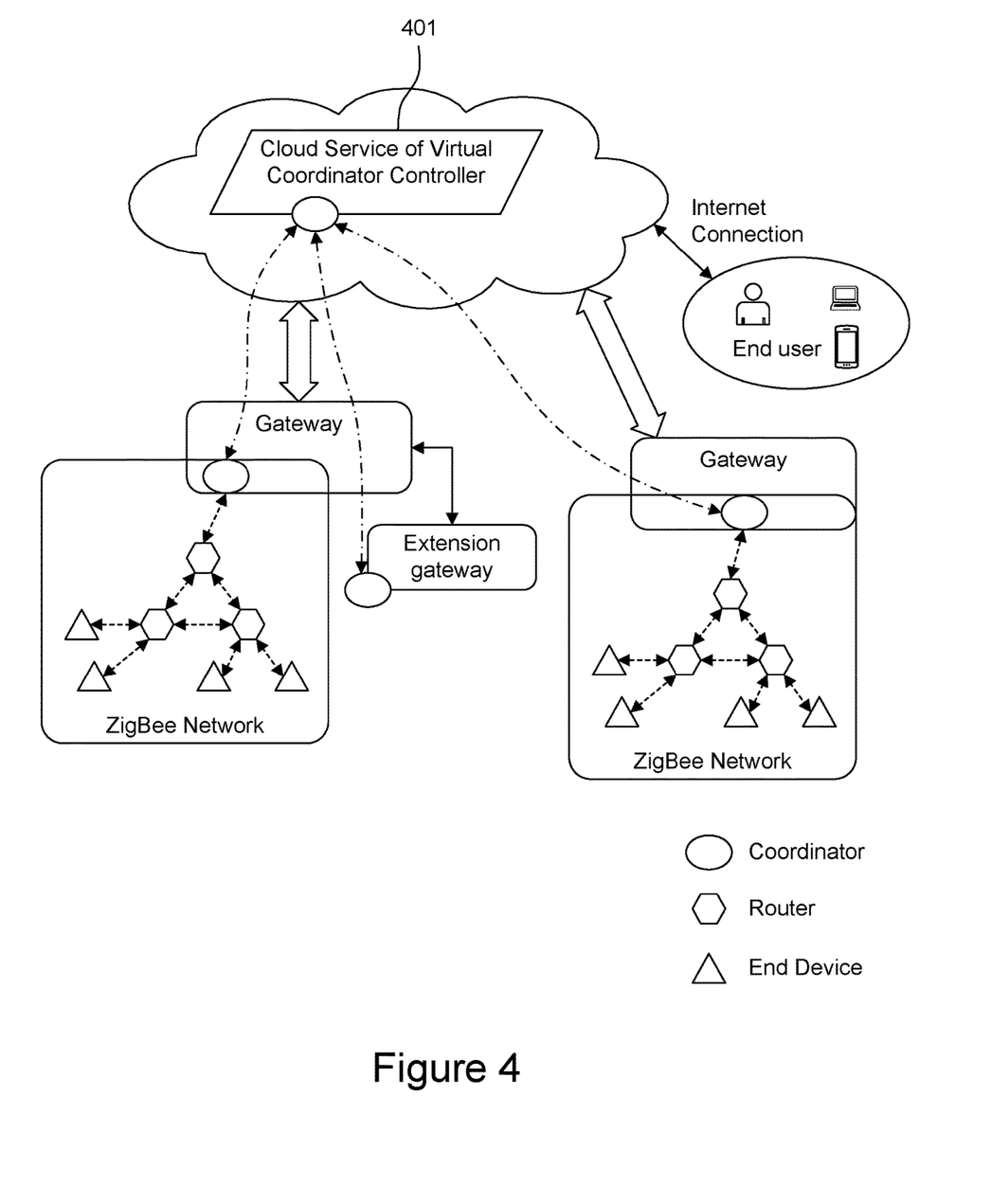
FIG. 4 is a schematic diagram showing a controller for controlling the ZigBee® coordinators in a ZigBee® network according to an embodiment of the disclosure.

FIG. 4 is a schematic diagram showing a controller 401 for controlling ZigBee® coordinators in a ZigBee® network according to an embodiment of the disclosure.

In FIG. 4, the controller 401 for controlling the ZigBee® coordinators in a ZigBee® network is shown at the server side to provide a cloud service as a virtual coordinator controller of ZigBee® coordinators. The virtual coordinator controller can loop-up and match a trustable backup coordinator among manageable devices. The virtual coordinator controller can regularly monitor the status of all ZigBee® coordinators in the network and store network-specific tables (such as routing, binding and neighborhood tables) of active coordinators. If Single Point Failure or other problem occurs to the ZigBee® coordinator, the virtual coordinator controller will trigger a coordinator failure recovery mechanism. The virtual coordinator controller will provide the capability to switch back to the original coordinator when it is detected to be back to normal. With the virtual coordinator controller, several different independent ZigBee® networks can be combined as one ZigBee® network with one Coordinator, to some extent.

According to the cloud service with the virtual coordinator controller shown in FIG. 4, there is provided a mechanism for controlling ZigBee® coordinators of a plurality of ZigBee® networks, which can address the Single Point Failure of Coordinator of an independent ZigBee® network. In FIG. 4, for illustrative purpose, only two ZigBee® networks are shown. It can be appreciated that the mechanism can apply to the case of more than two ZigBee® networks.

An end user can deploy a ZigBee® network for applications, such as home automation, healthcare, and surveillance, with a gateway via a service provider according to the network structure shown in FIG. 4. The end user can also deploy one or more extension gateways to extend WiFi or Ethernet. FIG. 4 shows a gateway and an extension gateway. Since such gateway and extension gateway are all the manageable devices of the service provider, both of them are equipped with ZigBee® coordinators. As shown in FIG. 4, a virtual coordinator controller was deployed by the service provider, for example in the headend system, to provide a cloud service. To implement the functionality of the virtual coordinator controller, some configuration and data collection may be needed, which can be carried out during the installation and debug phase or during the firmware upgrading phase of the gateways and the ZigBee® networks.

Figure 5:
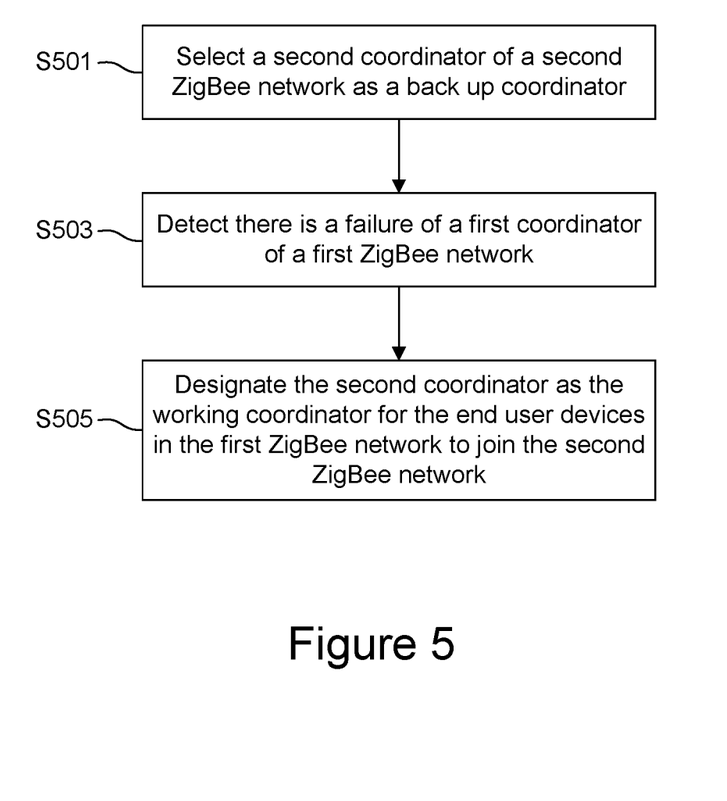
FIG. 5 is a flowchart illustrating a process for activating a backup coordinator when a Single Point Failure of Coordinator occurs in a ZigBee® network according to an embodiment of the disclosure.

FIG. 5 is a flowchart illustrating a process for activating a backup coordinator when a Single Point Failure of Coordinator occurs in a ZigBee® network according to an embodiment of the disclosure.

Initially, a first coordinator in the gateway in a first ZigBee® network is designated as the working coordinator. As illustrated with reference to FIG. 1, a working coordinator is in charge of the forming of a ZigBee® network. During the forming the ZigBee® network, the working coordinator will initiate the ZigBee® network and communicate with a router to finalize the network. Once the ZigBee® network is formed, the working coordinator will regularly communicate with the router to perform a health check.

At step S501, the virtual coordinator controller selects a second coordinator of a second ZigBee® network as a backup coordinator.

At step S503, the virtual coordinator controller detects whether there is a failure of the first ZigBee® coordinator. The failure of the first ZigBee® coordinator, which is the working coordinator in this case, can be detected via a regular health check process for the first ZigBee® coordinator. The health check process can be either an initial report sent by the gateway or a health polling carried out by the virtual coordinator controller. For example, a software stack or process can be provided at the gateway, which communicates with ZigBee® coordinator directly. The cloud service can communicate with the software stack or process the health check if the ZigBee® coordinator is working properly.

If a failure of the working coordinator is detected at step S503, at step S505, the virtual coordinator controller designates the second ZigBee® coordinator as the new working coordinator for the end user devices in the first ZigBee® network to join the second ZigBee® network.

When the second ZigBee® coordinator, which is the backup ZigBee® coordinator in this case, is designated as the new working coordinator, the virtual coordinator controller will send all the network settings to the new working coordinator which will initialize the new ZigBee® network with all the original ZigBee® routers. Since the new working coordinator operates as the dedicated backup of the original working coordinator, the virtual coordinator controller can also change the MAC address as well as the ZigBee® Key of the new working coordinator to be exactly the same as the original working coordinator. This can help reduce the interruption time of the ZigBee® network. The new working coordinator can communicate with the routers to form a new ZigBee® network which includes the end user devices of the first and second networks. With the process of this embodiment, the end user is able to retrieve/control the remote ZigBee® sensors in the first ZigBee® network even the original ZigBee® coordinator fails.

The virtual coordinator controller can be implemented in a home entry gateway to coordinate all the ZigBee® sensors of a plurality of ZigBee® networks. This is meaningful for company buildings or large house where multiple dependent ZigBee® networks are deployed. In such case, normally a main entry gateway and several extension gateways are provided by a service provider.

When the virtual coordinator controller is implemented in a home entry gateway, the second ZigBee® coordinator described with reference to the FIG. 5 can be selected from coordinators of the home entry gateway. The second ZigBee® coordinator can also be selected from coordinators of extension gateways of the same end user.

The virtual coordinator controller can also be implemented at the service provider side to provide a cloud service to overcome the problem of Single Point Failure of Coordinator. In this case, since the gateways of other end users deployed by the same service provider are manageable to the service provider, the coordinators of the gateways of other end users can be used as the new working coordinator to replace the failed one.

Figure 6:
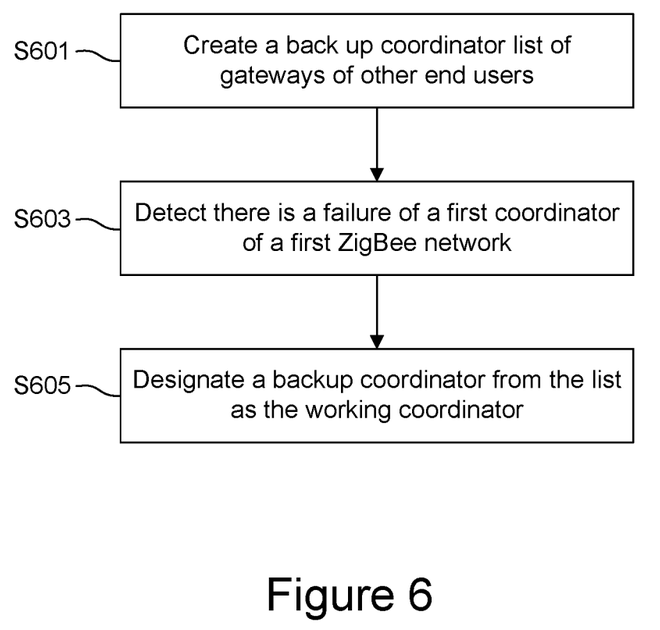
FIG. 6 is a flowchart illustrating a process for activating a backup coordinator when a Single Point Failure of Coordinator occurs in a ZigBee® network according to another embodiment of the disclosure.

FIG. 6 is a flowchart illustrating a process for activating a backup coordinator when a Single Point Failure of Coordinator occurs in a ZigBee® network according to another embodiment of the disclosure.

The process shown in FIG. 6 deals with a case that there is no extension gateway deployed by a service provider for the same end user. Given the fact that gateways deployed by the same service provider for other end users are all manageable devices for the service provider, at step S601, a Trustable Backup Coordinator list can be created by the controller, which includes at least one candidate coordinator to be the backup of the working coordinator selected from those of the gateways of other end users. A backup coordinator can be selected from the Trustable Backup Coordinator list when the working coordinator fails.

In an example, the Trustable Backup Coordinator list can be maintained according to the distance of a backup coordinator to the current working coordinator. The distance can be determined based the addresses of the discussed gateways deployed by the service provider. It can be appreciated that existing online location applications, such as Google Earth, can be used for determining the distance based on the addresses. The WiFi capability of the discussed gateways can also be used to determine the distance. The WiFi capability of a gateway enables the hotspot functionality of the service provider, which can recognize the related gateway in the backend based on the recognized SSID. The Trustable Backup Coordinator list can be arranged in order of the determined distances, from small to large. During the gateway installation, rebooting, firmware upgrading process, the gateway with the candidate coordinator can be verified if it is able to communicate with the original ZigBee® router. For example, when the gateway with the candidate coordinator reboots remotely, it collects the information of all the ZigBee® routers of the coordinator and store the information to the server of the service provider. Alternatively, during the gateway installation phase by the service provider, it checks whether candidate coordinators can receive the beacon signals from the ZigBee® router.

At step S603, the virtual coordinator controller detects whether there is a failure of the working coordinator. Detection of a failure of ZigBee sensor nodes are known in the art. Some of the known technologies detect the node failure on the basis of the delay incurred in propagation and also the energy associated with sensors in the field of deployment. No further details will be given in this respect.

If a failure of the working coordinator is detected at step S603, at step S605, the virtual coordinator controller designates a backup ZigBee® coordinator selected from the Trustable Backup Coordinator list as the new working coordinator. In an example, a smaller distance of a backup coordinator in the list to the current working coordinator has the priority to be selected as the new working coordinator.

When one of the backup ZigBee® coordinators from the list is activated as the new working coordinator, the virtual coordinator controller will send all the network settings to the coordinator. Similarly, the virtual coordinator controller can also change the MAC address as well as the ZigBee® Key of the new working coordinator to be exactly the same as the original working coordinator. This kind of flexibility is can help to reduce the interruption time of the ZigBee® network. The new working coordinator can communicate with routers to form a new ZigBee® network, by which the end user is able to retrieve/control these remote ZigBee® sensors. According to this embodiment, the end user whose ZigBee® coordinator fails can still access/retrieve/control his/her own ZigBee® sensors. If the switching time for the backup coordinator to become the working coordinator is very short, the Single Point Failure of Coordinator will not lead to any big Service Level Agreement (SLA) downgrade for the service provider and the end user.

Figure 7:
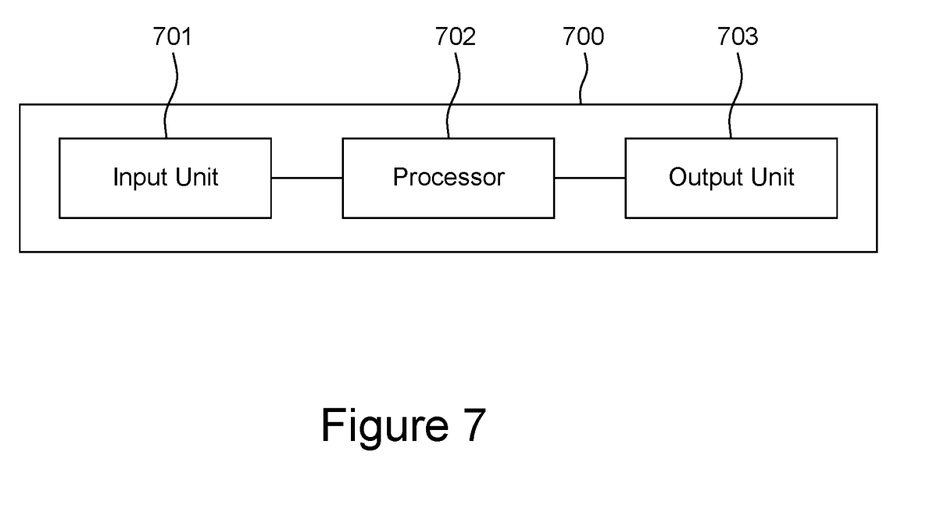
FIG. 7 is a block diagram illustrating an apparatus for controlling ZigBee® sensors according to an embodiment of the disclosure.

FIG. 7 is a block diagram illustrating an apparatus for controlling ZigBee® sensors according to an embodiment of the disclosure. As shown in FIG. 7, the apparatus 700 includes an input unit 701, a processor 702, and an output unit 703. The input unit 701 is configured to receive messages from ZigBee® sensors of network devices. In an example, the input unit 701 can include a communication port capable of receiving data wirelessly or in a wired manner. The processor 702 is configured to implement the detection and determination process in the flow described above with reference to the FIGS. 5 and 6 to generate a control message for the sensors of the network devices. The output unit 703 is configured to output the control message to the ZigBee® sensors of the network devices. The apparatus 700 can be embodied as a controller implemented at the server of a service provider or an entry gateway of an end user.

The present disclosure may be implemented by a computer program product, for example, in the form of a computer-readable medium carrying computer program code structured in computer program modules. The computer program modules, when executed in a processor, cause a server or a gateway to perform the actions described above in conjunction with the figures mentioned above. Alternatively, at least one of the code means may be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for use in a gateway at a server side of a service provider of a first network and a second network comprising:
   on a condition that a failure of a first network sensor, which is a coordinator for network sensors in the first network, is detected, designating a second network sensor outside the first network as a working coordinator for the network sensors in the first network to join the second network independent of the first network;
   wherein the first network and second network are under the control of a same gateway; and
   wherein a media access control (MAC) address and a ZigBee key of the second network sensor is changed to be the same as a MAC address and a ZigBee key of the first network sensor.

2. The method for controlling network sensors according to claim 1, wherein the network sensors are ZigBee® sensors and the first and second networks are ZigBee® networks.

3. The method of claim 1, further comprising sending network settings to the second network sensor.

4. A method for controlling network sensors, comprising:
   on a condition that a failure of a first network sensor, which is a coordinator for network sensors in a first network, is detected, designating a second network sensor outside the first network as a working coordinator for the network sensors in the first network to join a second network independent of the first network;
   wherein the first network is under the control of a first gateway and the second network is under the control of a second gateway;
   wherein the first gateway and second gateway are for the same user; and
   changing a media access control (MAC) address and a ZigBee key of the second network sensor to be the same as a MAC address and a ZigBee key of the first network sensor.

5. The method according to claim 4, further comprising sending network settings to the second network sensor.

6. A gateway for a first and second network, for controlling network sensors, comprising:
   a processor configured to, on a condition that a failure of a first network sensor acting as a coordinator for network sensors in the first network is detected, designate a second network sensor outside the first network as a working coordinator for the network sensors in the first network to join the second network independent of the first network;
   wherein the processor is further configured to change a media access control (MAC) address and a ZigBee key of the second network sensor to be the same as a MAC address and a ZigBee key of the first network sensor.

7. An apparatus, at a server side of a service provider of a first network and second network, for controlling network sensors, comprising:
   a processor configured to, on a condition that a failure of a first network sensor acting as a coordinator for the network sensors in a first network is detected, designate a second network sensor outside the first network as a working coordinator for the network sensors in the first network to join a second network independent of the first network,
   wherein the processor is further configured to change a media access control (MAC) address and a ZigBee key of the second network sensor to be the same as a MAC address and a ZigBee key of the first network sensor.

8. The gateway for controlling network sensors according to claim 6, wherein the network sensors are ZigBee® sensors and the first and second networks are ZigBee® networks.

* * * * *